3,319,314
SURFACE TREATMENT FOR JOINTLY IMPROVING FRICTION AND FLUIDTIGHTNESS

Jean Jacques Caubet, Saint-Etienne, France, assignor to Automobiles M. Berliet, Lyon, Rhone, France, and Hydromecanique et Frottement, Saint-Etienne, France, both French corporations
No Drawing. Filed June 7, 1965, Ser. No. 462,093
Claims priority, application France, July 22, 1964, 982,640, Patent 1,409,876
2 Claims. (Cl. 29—149.5)

It is already known to resort to certain surface treatments for conferring, on two metal parts in mutual friction improved characteristics in respect of frictional resistance, wear and sizure. The better known of these treatments consist either in hardening the surface layers by incorporating nitrogen through nitridation in cracked ammonia, soft nitridation, on nitridation in a salt bath, commercially known under the name "Tenifer" or "Tufftride" among others, in covering the rubbing surface with a non-metallic substance designed to act as a welding inhibitor (which can be achieved by phosphatization or "Parkerization" for example), or in combining these two methods by resorting, for instance, to melted salt baths based jointly on nitrogen and sulphur (one of which baths is known by the trade name "Sulfinuz").

Heretofore, however, the use of these surface treatments in hydromechanics has been limited by a serious constraint, namely in that the roughness they impart to the treated pieces is incompatible with the integrity of a conventional rubber or plastic sealing gland. Thus, considering for example the typical case of actuator piston rods, it becomes virtually mandatory to choose between satisfactory resistance to wear of the front bearing or satisfactory durability of the sealing member. It has hitherto been impossibe to circumvent this choice of alternatives. The same problem arises in respect of the leaktightness of a rotating shaft extending through a wall, an example being the case of rotary pumps and compressors, or rotary hydraulic or pneumatic motors.

The present invention has for its object to provide a surface treatment method which jointly imparts to such surfaces excellent resistance to wear and a condition particularly well-suited to proper functioning of the sealing member.

The method according to the invention for treating the surfaces of metal parts sliding over or inside each other or rotating inside each other provides such parts with high resistance to wear and with a surface condition which markedly reduces wear in the sealing glands, or the like, applied against parts possessed of a rotating motion relatively to such sealing means. Essentially, the subject method of the invention includes three successive operations.

The parts are first machined so that their rubbing surfaces still retain marked roughness and so that the predominant direction of the machining marks or lines is substantially perpendicular to the desired direction of relative displacement of the parts.

The rubbing surfaces are then subjected to a heat treatment whereby a non-metallic substance or a transition metal is introduced into these surfaces.

These surfaces are rolled by means of rollers of sufficiently small diameter relative to the radius of curvature of the treated parts and with a force sufficient to exceed everywhere, on the surface, the elastic limit of the materal of which the parts are made.

The underlying principle of the effect of the subject treatment of the invention may be explained on the basis of the following three considerations.

It is well known that nitrogen-based surface treatments effected at temperatures above 500° C. introduce nitrides into the first tenths of the surface of a steel part; it is also known that the fatigue strength imparted to such surface layers by these nitrides is all the greater as these nitrides are in supersaturated solution, whereas a micrographic examination following such a treatment reveals the presence in the first tenths of a steel or cast-iron surface of precipitated nitride rodlets, the role of which is consequently no longer as important. Now it has been found that if such a surface is stressed in excess of the elastic limit of the material by means of biaxial compression loads, the nitrides which had previously been precipitated revert to a state of solution.

It is also known that surface treatments resulting in diffusion, substitution, nitridation and, generally speaking, a solid solution, considerably increase the accommodating capacity of a metallic material; now it has been discovered that a rubbing surface will have longer life if the lapping-in is effected by a rotation of the grain and a process of creep undergone by the grain layers, and not by an intragranular cold-hardening process; subsidiarily, it has been found that after a surface treatment of the kind specified hereinabove, the lapping-in process has to be effected by forging, that is to say by rolling, burnishing, or the like, and not by means of abrasive polishing powder.

Lastly, it has been discovered that satisfactory durability of a conventional lipped or toroidal sealing gland or the like, operating with a reciprocating motion, requires, not perfect polishing of the metal part on which it rubs, but a given optimal degree of roughness, with a predominant orientation of the grooves perpendicularly to the direction of the alternating motion; it has also been found that a surface condition very close to the theoretically ideal one could be achieved with advantage by rolling a metal surface treated as hereinbefore specified, the rollers being rolled on the surface of the part perpendicularly to the direction in which friction is ultimately to take place.

With regard to the first operation in the method according to the invention, namely rough machining of the surface of the parts, a roughness of the order of 2.5 to 3 microns has been found advantageous.

The second operation involves the surface incorporation of a metalloid or of a transition metal capable either of depositing on the surface of the part an ionic compound by reaction with the subjacent metal, or of inserting its atoms into the structure of the subjacent metal by forming a solid insertion solution. This incorporation may be performed in a salt bath or in a gaseous atmosphere, possible examples of the advocated transition metals or metalloids being nitrogen, sulphur, selenium or tellurium.

In cases where it is required to effect a surface incorporation of sulphur, recourse may be had to a sulphurizing salt bath or to a sulphurizing gaseous atmosphere for a period of time of at least two hours, at a temperature above 500° C.

By way of example, such a treatment may be performed by a method known in France by the trade name of "Sulfinuz." Of course, recourse may alternatively be had to any identical or similar method utilizing a salt bath or a gaseous medium for producing surface layers with structures or compositions similar or identical to those obtained by the "Sulfinuz" process.

In the case of the "Sulfinuz" process, the parts are preheated to about 300 to 350° C. and then immersed for two to six hours in a salt bath maintained at an approximate temperature of 570° C. and composed of an inactive base such as the alkaline and alkaline-earth chlorides and carbonates, enabling a melting point below 500° C. to be obtained, of sulphuretted compounds with a preponderant effect, and of buffer cyanides or cyanates for protecting the sulphuretted compounds and maintaining the bath in a reducing medium.

In cases where nitrogen is incorporated, recourse may be had to any convenient nitriding process or, for example, to the process known by the trade name of "Tenifer."

This last-mentioned process, also known in the Anglo-Saxon countries as the "Tufftride" process, is a soft nitriding process by which it is possible to obtain, on steel parts, an external layer comprising iron nitride and carbide covering a layer of nitrogen diffusion into the steel. This result can be achieved, for instance, by immersing the part for an adequate predetermined time in a salt bath heated to a temperature included between 550 and 580° C. and comprising approximately 32 to 40% of unstable potassium cyanate isomers and approximately 50 to 55% of potassium cyanide, the bath being puddled by blowing air through it.

Good results are also obtained when the parts have been subjected consecutively to a sulphurizing treatment and to a nitridation.

With regard to the final cold-hardening effected by rolling in accordance with the invention, the operating conditions must be such that the elastic limit of the material in the surface layers of the part being treated is definitely exceeded.

Finally, the metals of which the parts subjected to friction are made may be ordinary or alloyed steels or, more generally, any metal or alloy capable of hardening under cold-working and subsequently revealing a high density of sliding planes in their surface crystalline structure, examples of such metals and alloys being the austenitic stainless steels, hyper-eutectoid alloyed steels containing over 11% of manganese, or titanium and its alloys, all of which are readily available on the market.

Machine components treated in accordance with the present invention offer the following multiple advantages:

Increased resistance to pitting and scaling and, generally speaking, to all forms of ageing.

Resistance to surface bonding is likewise improved, while the coefficient of friction and the quantity of heat given off during a friction process of given parameters are markedly decreased.

All forms of decay in the frictional moment are retarded.

All other things being equal, the efficacy of a sealing gland is increased, regardless of whether the gland is of the lipped or toroidal type.

All other things being equal, the life of a sealing gland is lengthened by many times.

These advantages were demonstrated by the results of comparative tests performed by way of example on a hydraulic actuator.

The actuator comprised a piston rod 50 mm. in diameter. It was subjected to a bending moment such that the piston rod transmitted a force of between 2900 and 14,000N to the front bearing. The piston described a rectilinear motion embodying, on the one hand, a sinusoidal dominant with an amplitude of 63 mm. and a frequency of 1 c./s. and, on the other hand, a harmonic with an amplitude of 31.5 mm. and a frequency of 8 c./s. The front bearing was fitted with a lipped sealing member rubbing against the piston rod and designed to provide leaktightness under a hydraulic pressure of 140 bars.

In cooperation with this conventional ground, polished and chromium-plated piston rod, the seal began to show signs of sweating after two hours of operation.

Operating on a piston rod ground on a centreless grinding machine and subsequently treated in a "Sulfinuz" bath, the same seal lasted for ten minutes.

On a pitson rod made of a 0.45% carbon steel treated to withstand 90 kgf./mm.$^2$ and having undergone a surface treatment according to the invention, the same seal lasted for over two hundred hours.

Thermocouples placed in the front bearing indicated that the amount of heat given off in unit time by the combined friction of the bearings and the seal was roughly in the ratio of 8 for a hard chromium-plated rod, 5 for the centreless-ground rod treated in a "Sulfinuz" bath and 1 for the rod treated according to the invention.

What is claimed is:

1. Surface treatment of a cold hardenable metal part intended for use in rubbing contact with another member, said surface treatment imparting high wear resistance to the treated metal part, said surface treatment comprising:
   (1) machining said metal part to produce a rough surface having machining marks substantially perpendicular to the intended direction of displacement relative to said other member,
   (2) heat-treating the machined part in a salt bath or gaseous atmosphere and simultaneously introducing into the surface of said part a substance selected from the group consisting of nitrogen, sulfur, selenium, tellurium, and mixtures thereof, and
   (3) cold hardening the heat-treated metal part with a force sufficient to exceed the elastic limit of the metal.

2. Surface treatment according to claim 1 wherein the machining marks have a depth of the order of 2.5 to 3 microns.

References Cited by the Examiner

UNITED STATES PATENTS

| | | | |
|---|---|---|---|
| 1,658,173 | 2/1928 | Perks | 308—241 |
| 1,964,671 | 6/1934 | Nesbitt | 308—241 |
| 2,622,993 | 12/1952 | McCullough | 308—241 X |
| 2,697,645 | 12/1954 | Mitchell | 308—241 |
| 3,194,759 | 7/1965 | Devine | 308—241 |
| 3,195,221 | 7/1965 | Martin et al. | 29—149.5 |

FOREIGN PATENTS 769,467   3/1957   Great Britain.

JOHN F. CAMPBELL, *Primary Examiner.*

THOMAS H. EAGER, *Examiner.*